(12) United States Patent
Beemer et al.

(10) Patent No.: US 11,647,375 B2
(45) Date of Patent: *May 9, 2023

(54) PROVIDING RESPONDERS WITH RELEVANT REAL-TIME INFORMATION

(71) Applicant: DISH Network L.L.C., Englewood, CO (US)

(72) Inventors: Houston Beemer, Littleton, CO (US); Angela Beemer, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,614

(22) Filed: Sep. 27, 2022

(65) Prior Publication Data

US 2023/0017199 A1    Jan. 19, 2023

Related U.S. Application Data

(63) Continuation of application No. 17/380,223, filed on Jul. 20, 2021, now Pat. No. 11,483,693, which is a
(Continued)

(51) Int. Cl.
| | |
|---|---|
| *G09G 5/00* | (2006.01) |
| *H04W 4/90* | (2018.01) |
| *H04L 67/12* | (2022.01) |
| *H04W 4/44* | (2018.01) |
| *G01C 21/34* | (2006.01) |

(Continued)

(52) U.S. Cl.
CPC .......... *H04W 4/90* (2018.02); *G01C 21/3407* (2013.01); *G08B 25/10* (2013.01); *H04L 67/12* (2013.01); *H04W 4/44* (2018.02); *H04W 76/10* (2018.02)

(58) Field of Classification Search
CPC ..... G06T 19/006; G06T 15/005; G06T 17/05; G06F 30/13
See application file for complete search history.

(56) References Cited

U.S. PATENT DOCUMENTS

| | | |
|---|---|---|
| 2015/0327010 A1 | 11/2015 | Gottschalk et al. |
| 2018/0365785 A1 | 12/2018 | Boss et al. |
| 2019/0102488 A1 | 4/2019 | Santarone et al. |

OTHER PUBLICATIONS

U.S. Appl. No. 16/568,019, filed Sep. 11, 2019.
(Continued)

*Primary Examiner* — Hau H Nguyen
(74) *Attorney, Agent, or Firm* — Wash Park IP Ltd.; John T. Kennedy

(57) ABSTRACT

Providing of relevant information to a responder is described. A responder system receives alert data identifying an incident location. Available relevant data for the incident location is stored in the responder system. When relevant data is not stored, relevant data for the incident location is obtained from an external data source and stored in the responder system. While proceeding to the incident location and based on the alert data and the relevant data, initial augmented reality information is prepared for presentation to a responder. Upon arriving at the incident location, second augment reality information is generated. Upon arriving within a localized area of the incident location, an IoT device operable within the localized area is identified and selected and a communications link therewith is established. First IoT device data is received from the selected IoT device, and based thereon third augmented reality information is generated.

20 Claims, 6 Drawing Sheets

Related U.S. Application Data continuation of application No. 16/568,019, filed on Sep. 11, 2019, now Pat. No. 11,102,637.

(51) Int. Cl.
*G08B 25/10* (2006.01)
*H04W 76/10* (2018.01)

(56) References Cited

OTHER PUBLICATIONS

U.S. Appl. No. 17/380,223, filed Jul. 20, 2021.
U.S. Appl. No. 17/877,736, filed Jul. 29, 2022.
U.S. Appl. No. 17/891,830, filed Aug. 19, 2022.
U.S. Appl. No. 17/877,736, filed Jul. 29, 2022, Amber Bellerjeau.
U.S. Appl. No. 17/891,830, filed Aug. 19, 2022, Caroline Elizabeth Condon.
U.S. Appl. No. 17/953,614, filed Sep. 27, 2022, Houston Beemer.
"Choosing Your Motion Detection Devices—Plume Help," Plume Inc. 2022, downloaded from the Internet on May 4, 2022 from https://support.plume.com/hc/en-us/articles/360043393453-Choosing-your-Motion-Detection-Devices-.
"What devices are eligible or detecting motion?" Plume Design Inc., 2022, as downloaded from the Internet on May 4, 2022 from https://support.plume.com/hc/en-us/articles/360043364893-What-devices-are-eligible-for-detecting-motion.
"What is Sense?" Plume Design Inc., 2022, as downloaded from the Internet on May 4, 2022 from https://support.plume/com/hc/en-us/articles/360042635193-What-is-Sense-.
"Why is there no Sense coverage in a room where I have a Wi-Fi connection?" Plume Design Inc., 2022, as downloaded from the Internet on May 4, 2022 from https://support.plume.com/hc/en-us/articles/360043658413-why-is-there-no-Sense-coverage-in-a-room-where-I-have-a-wi-fi-connection-.
"Chapter 7", downloaded from the Internet on Oct. 21, 2020, from http://aturing.umcs.maine.edu/ meadow/courses/cos335/COA07.pdf.
"CSCI 4717", downloaded from the Internet on Oct. 21, 2020 from https://faculty.etsu.edu/tarnoff/ntes4717/week_06/IO.ppt, and converted into PDF form.
"Lecture 19", downloaded from the Internet on Oct. 21, 2020, from http://www.ecs.csun.edu/ cputnam/Comp546/Input-Output-Web.pdf.
Delaney, John R., PC Magazine, Jul. 27, 2021, "Plume SuperPod With Wi-Fi 6 Review," as downloaded from the Internet on May 4, 2022 from: https://www.pcmag.com/reviews/plume-superpod-with-wi-fi-6.
HomePass, "How do I access my home's motion history?", Plume Design Inc., as downloaded from the Internet on May 4, 2022 from https://support.plume/com/hc/en-us/articles/360042906154.
Salter, Jim, Mar. 3, 2020, "From Wi-Fi to Spy-Fi—we test Plume's new motion detection featue |Ars Technica," as downloaded from the Internet on May 4, 2022 from https://artechnica.com/gadgets/2022/03/from-wi-fi-to-spy-fi-we-test-plumes-new-motion-detection-feature/.

PROVIDING RESPONDERS WITH RELEVANT REAL-TIME INFORMATION

CROSS-REFERENCE TO RELATED APPLICATIONS

This application is a Continuation of U.S. patent application Ser. No. 17/380,223, filed on 20 Jul. 2021, in the name of inventors Houston Beemer and Angela Beemer, entitled "Providing Responders with Relevant Real-Time Information," which is a Continuation of U.S. patent application Ser. No. 16/568,019, filed on 11 Sep. 2019, in the name of inventors Houston Beemer and Angela Beemer, entitled "Devices, Systems and Processes for Providing Responders with Relevant Real-Time Information," and which issued as U.S. Pat. No. 11,102,637 on 24 Aug. 2021, priority is claimed and the entire contents of each of the above identified applications are incorporated herein by reference.

TECHNICAL FIELD

The technology described herein generally relates to devices, systems, and processes for providing responders, such as fire, ambulance, police and others with relevant real-time information. More specifically, the various embodiments disclosed generally relate to providing providers with real-time information regarding a location and, when available, situation of an incident. The various embodiments disclosed generally relate to utilizing one or more Internet-of-Things (IoT) devices for interconnection with a responder system in order to provide a responder with relevant and real-time information. Augmented reality and other information presentation technologies may be used in presenting the information to the responder.

BACKGROUND

Today, responders (for example, fire department personnel) often are provided incomplete and/or non-situation specific information regarding an incident, for example a structure fire. Typically, information provided to a responder may include a geographic location, as delineated by a street address, mile marker or similar designator. Such information, however, does not include location specifics, such as a floor, layout of floor, identification of hazards, personnel expected on the floor, and other information which a responder may find helpful in responding to an incident. Likewise, devices, systems and processes for enabling a responder to navigate to, around, through and otherwise respond to an incident are currently lacking. Further, real-time and situational information about an incident and/or an incident location is typically not provided to responders.

Accordingly, a need exists to provide a responder with real-time locational and situational information regarding a given incident.

SUMMARY

The various embodiments of the present disclosure relate in general to devices, systems, and processes for providing responders, such as fire, ambulance, police and others with relevant real-time information. In accordance with at least one embodiment of the present disclosure, a process, for providing relevant, real-time information to a responder may include receiving, by a responder system, alert data identifying an incident location. The process may also include determining whether relevant data for the incident location is stored in the responder system. For at least one embodiment and when relevant data is not stored in the responder system, the process may include obtaining the relevant data for the incident location from an external data source and storing the obtained relevant data in the responder system.

For at least one embodiment and while proceeding to the incident location, the process may include generating, based on the alert data and the relevant data, initial augmented reality information for presentation to a responder associated with the responder system.

For at least one embodiment and upon arriving at the incident location, the process may include generating second augment reality information for the responder.

For at least one embodiment and upon arriving within a localized area of the incident location, the process may include identifying and selecting an IoT device operable within the localized area, establishing a communications link with the selected IoT device, receiving first IoT device data from the selected IoT device, and generating, based on the first IoT device data, third augment reality information.

In accordance with at least one embodiment of the present disclosure, a process, for providing relevant, real-time information to a responder may include use of initial augmented reality information that includes driving instructions for proceeding, using a vehicle system, from a current location of the responder to the incident location. For at least one embodiment, the driving instructions may provide a route optimized to maintain communications linkages between a vehicle system and a base station. For at least one embodiment, the vehicle system may include use of at least one of a fire engine, an airplane, a helicopter, a police car, an ambulance, an automobile, a truck, and a bicycle.

For at least one embodiment, a process, for providing relevant, real-time information to a responder may include, while the responder is proceeding to the incident location, determining if updated alert data is available and, if updated alert data is available, processing the updated alert data. For at least one embodiment, initial augmented reality information may be updated based on updated alert data.

For at least one embodiment, a process, for providing relevant, real-time information to a responder may include, while the responder is proceeding to the incident location, determining in local data is available and, if local data is available, processing the local data, and updating initial augmented reality information based on the processed local data.

For at least one embodiment, a process, for providing relevant, real-time information to a responder may include use of second augmented reality information that includes information which informs a responder by providing at least one of directions to a localized area, conditions present at the localized area, and hazards present within the localized area.

For at least one embodiment, a process, for providing relevant, real-time information to a responder may include use of an IoT device. For at least one embodiment, the IoT device is at least one of an IoT sensor and an IoT panel.

For at least one embodiment, a process, for providing relevant, real-time information to a responder may include use of a third augmented reality information that includes information relevant to the responder based upon at least one of a mission presently assigned to the responder, a task being performed by the responder, conditions present within a localized area, equipment available to the responder, and training status of the responder.

For at least one embodiment, a process, for providing relevant, real-time information to a responder may include determining, by a responding system, whether a new task has been assigned to the responder; and when the new task has been assigned to the responder, generating fourth augmented reality information. For at least one embodiment, the fourth augmented reality information may be generated based on a first IoT device data and a second IoT device data.

In accordance with at least one embodiment of the present disclosure, a system for providing relevant, real-time information to a responder may include a responder system and a first IoT device configured to provide first IoT device data regarding a localized area of an incident to the responder system. For at least one embodiment, the responder system may be configured to provide human perceptible augmented reality information to a responder to an incident based at least one the first IoT device data.

For at least one embodiment, a system for providing relevant, real-time information to a responder may include use of a responder system configured to store relevant data regarding an incident location. For at least one embodiment, the responder system may be configured, based on the stored relevant data, to provide initial augmented reality information to a responder. For at least one embodiment, the initial augmented reality information may include directions from a present location of a responder to an incident location. For at least one embodiment, the initial augmented reality information may include a "fly-by" presentation of an incident location.

For at least one embodiment, a system for providing relevant, real-time information to a responder may include use of augmented reality information that is generated based on real-time data generated by a first IoT device. For at least one embodiment, a first IoT device may be at least one of an IoT sensor and an IoT panel.

For at least one embodiment, a system for providing relevant, real-time information to a responder may include use of a first IoT device configured to provide first IoT device data that includes at least one of image data, sound data, environmental data, location data, structural data, population data, geographic data, and hazard data.

For at least one embodiment, a system for providing relevant, real-time information to a responder may include use of a second responder system associated with a second responder. For at least one embodiment, the second responder system may be configured to provide human perceptible augmented reality information to the second responder to an incident based on at least one second IoT device data.

For at least one embodiment, a system for providing relevant, real-time information to a responder may include use of a vehicle system, communicatively coupled to a responder system. For at least one embodiment, the vehicle may also be communicatively coupled to at least one of a second responder system and a base station. For at least one embodiment, the vehicle system may be configured to communicate first IoT device data to the second responder system and to the base station. For at least one embodiment, the vehicle system may be configured to communicate second IoT device data to the first responder system and to the base station. For at least one embodiment, the vehicle system may be configured to communicate squad data to one or more of and, in at least one embodiment, to each of the first responder system, the second responder system and the base station.

For at least one embodiment, a system for providing relevant, real-time information to a responder may be configured to enable a commander, at base station, to communicate an evacuation order to each of a first responder and a second responder via a vehicle system, a first responding system and a second responding system.

For at least one embodiment, a system for providing relevant, real-time information to a first responder may be configured to include a first responding system which, upon receiving an evacuation order, generates and presents first augmented reality evacuation information to the first responder. For at least one embodiment, a second responder system may be configured to generate and present second augmented reality evacuation information to a second responder.

In accordance with at least one embodiment of the present disclosure, a responding system for use in providing real-time relevant information to a responder regarding an incident may include a hardware configured processor module configured to execute computer executable instructions for generating augmented reality information based on stored data and IoT device data received from one or more external IoT devices. For at least one embodiment, a responding system may include an input/output module configured to present the augmented reality information to a responder. For at least one embodiment, the augmented reality information may inform the responder regarding at least one of directions to a localized area of an incident, conditions at the localized area, and victims present within the localized area.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1A:
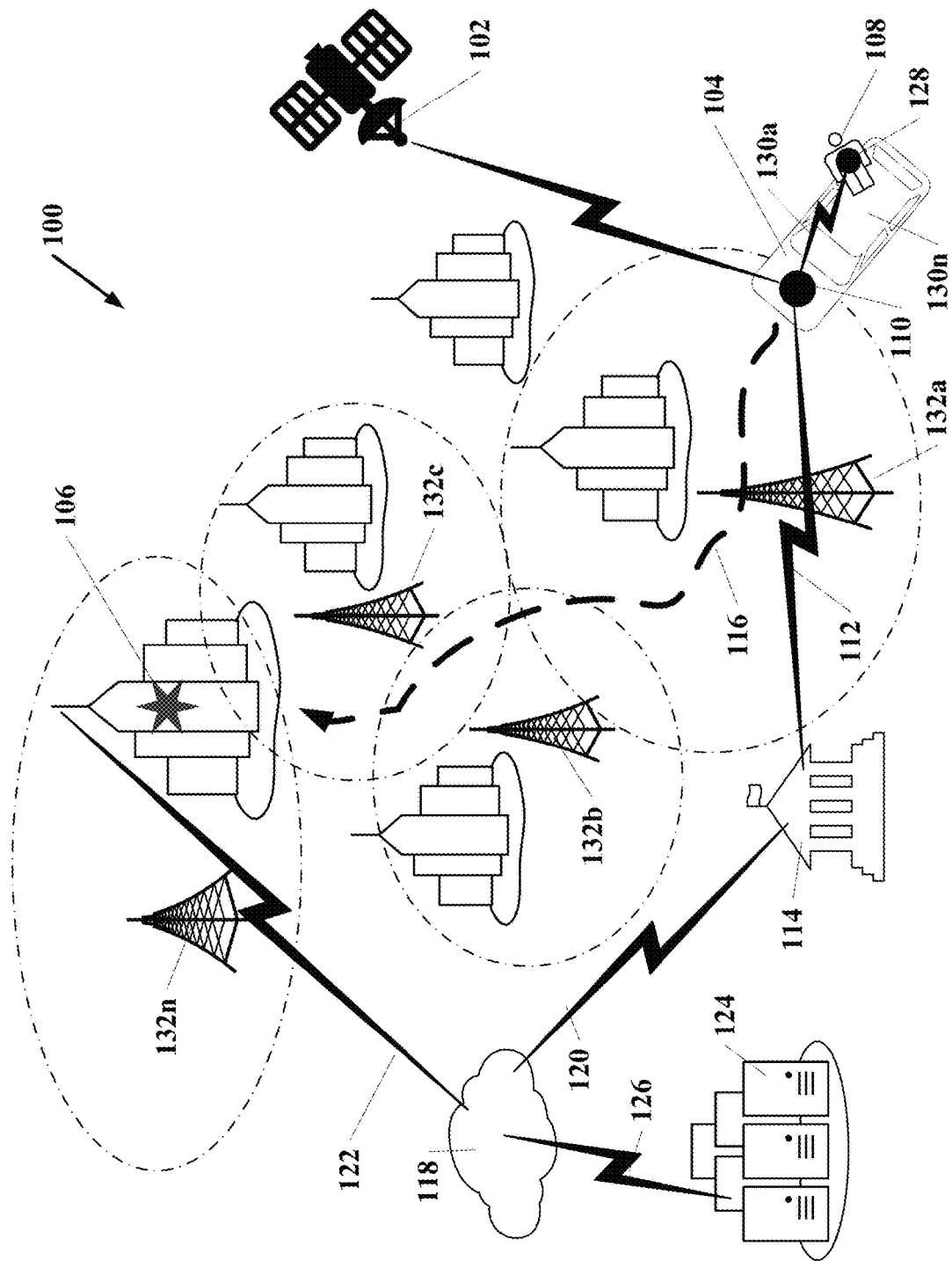
FIG. 1A is a schematic representation of a system supporting an initial response by a responder to an incident and in accordance with at least one embodiment of the present disclosure.

The various embodiments described herein are directed to devices, systems, and processes for providing responders with relevant, real-time locational and situational information regarding an incident. One or more of the various embodiments described herein utilize combinations of Internet of Things (IoT) devices or similar devices, mobile computing technologies, such as those provided by smartphones, tablets and the like, network based to data sources such as those provided by cloud and/or mobile based computing resources, augmented reality technologies, and other technologies to inform responders about conditions of a given incident.

As used herein, an "incident" may include, but is not limited to, any event to which a response by a responder (as further defined below) is requested. Non-limiting examples of an incident include a structure fire, a forest or grasslands fire, a car accident, a rescue event—such as a water rescue, a heart attack or other medical event, a shooting, robbery or other crime event, a flood, tornado, earthquake, or other natural disaster event, a ruptured gas line, a water leak, a collapsed power line or other utility event, or other events. In short, an incident includes any event to which a responder may be requested to respond on a real-time basis.

As used herein, a "responder" is any person, and groups of persons, that responds at any time to an incident. Non-limiting examples of responders include personnel with public service and governmental organizations such as those with a fire department, police department, emergency medical services, search-and-rescue, Coast Guard, National Guard, power companies, water companies, and any other persons or entities that respond to an incident.

As used herein, "real-time" generally relates to periods that arises within a given window about an incident. Real-time may include a period that occurs prior to an incident being initiated, while an incident is on-going, and post-termination of an incident. As used herein, an incident is considered to be initiated when a "first alert message," (as also used herein, an "alert") or similar message, is communicated to an emergency response system, such as the 911 system used in the United States. It is to be appreciated that the alert may be communicated automatically, semi-automatically, by a human action, or otherwise. For example, an alert may be communicated by a building structure's fire alarm system communicating an alarm code to an emergency response system when smoke or heat is detected in a given structure. Likewise, an alert may be communicated semi-automatically by an activation of an alarm panel, which may occur by human interaction with emergency response system personnel. Likewise, an alert may be communicated by human interaction with a person calling an emergency response system and verbally communicating incident type and/or location information to operators of the emergency response system.

Further, an incident—once initiated—is considered to be terminated when an authorized responder designates the same as so occurring, such as by providing an "all clear message" status or the like (herein, a "clear"). Thus, an incident is typically bounded by an initiation time, as based on a first alert message, and a termination time, as based on an all clear message.

It is to be appreciated that data available prior to initiation of an incident may be informative to a responder in assessing how to respond to a given incident. Accordingly, "real-time data" as used herein may also include, for at least one embodiment, data captured prior to an alert for a given incident. For example, data pertinent to an automobile accident may include accident location, speed of vehicle, occupancy level (e.g., number of passengers), type of vehicle, whether air bags, seat belts or other safety mechanisms are engaged, and the like. Some of this data may exist, temporally, only before the first alert message is communicated. Likewise, some of this data may expire, unless other actions are taken, prior to an all clear message. Accordingly, as used herein, real-time data may include data arising and recorded prior to an incident, data arising during an incident, and when available, data preserved for later use after an incident is cleared.

In accordance with at least one embodiment of the present disclosure, real-time data may be captured, recorded (as desired), and communicated to responders using any know or later arising technologies. Such real-time data may be processed automatically, semi-automatically and/or manually into real-time information. As used herein, "real-time information" refers to information presented to a responder during an incident. Real-time information may be derived from any available real-time data.

For example, and not by limitation, real-time data may include image data that may be captured, processed or otherwise converted into image information using any currently available and/or later arising image capture, processing, and/or presentation technologies. For example, image data may be captured across any desired range of the electromagnetic spectrum including, but not limited to, the human visible perceptible range, the infrared range, X-Ray ranges, or otherwise. Such image data may be converted into any desired humanly perceptible image format and presented as image information to a responder. Non-limiting examples of humanly perceptible image information include still, moving, time-lapse, time-warp, slow-motion, and other image and/or video (moving picture), graphic and other human visually perceptible formats.

Similarly, and for at least one embodiment, real-time data may include sound data that is captured, processed and presented as humanly perceptible sound information using any currently available and/or later arising sound technologies. Sound information may be presented to a responder as real-time information during an incident.

It is to be appreciated that other forms of real-time data and real-time information may be provided to a responder during an incident. Non-limiting examples of such data and information include environmental data, such as temperature, rate of temperature change, wind conditions, humidity conditions, water depth, current and tide characteristics, and other forms of environmental data and information. Any form of environmental data capture, communication, preservation, and presentation technologies may be utilized with one or more embodiments of the present disclosure to provide real-time environmental information to a responder regarding an incident.

For at least one embodiment, real-time data and real-time information may include one or more of various delineable sub-categories of information, such as location data and location information, structural data and structural information, population data and population information, geographic data and geographic information, hazard data and hazard information, and other sub-categories of data and information. For a non-limiting example, "location data" and "location information" may include data and information identifying an incident location. For a non-limiting example, "structural data" and "structural information" may include data and information regarding the structural characteristics of an incident location. Such structural characteristics may include, for example, locations of walls, doors, windows, stairwells, stand-pipes, sensor locations, or the like. The structural data may be obtained from blueprints or other data source and converted into structural information presented to a responder. As discussed below, such structural information may be provided to and used to assist a responder with routing to and/or about an incident location, for example, an office located on a floor of a multi-story building.

For at least one embodiment, real-time data and real-time information may include "population data" and "population information." Such population data may include, for example, an identification of a name, physical characteristics, number of persons and other data relating to one or more persons that may typically be present and/or are detected as being present at or about an incident location. Such population data may also include any information about whether such one or more persons are present, missing, absent, and/or likely to still be present at an incident location. Non-limiting examples of such population information may include height, weight, age, image, language preferences, disability concerns, medical condition(s), or other information about a person. For at least one embodiment, population information may be presented to a responder to a given incident. Such population information may include elements of population data relevant to a given responder. For example, a responder (such as a fire department person) conducting a search may be presented population information regarding only those persons typically within and/or detected as being present within a given area within which that responder is conducting a search. Such population information may be further filtered to exclude those persons who have checked in as having safely evacuated the incident area.

For at least one embodiment, real-time data and real-time information may include "geographic data" and "geographic information." Geographic data may include data that arises in addition to a given location's geographic coordinates (as measured in terms of position, altitude, elevation, attitude, or otherwise). A non-limiting example of geographic data includes data indicative of whether or when a given forest area previously burned (for example, for use in responding to a forest fire incident), the efficacy of prior response techniques, and the like. Such geographic data may be provided to a responder as geographic information that aids the responder in responding to the present incident.

For at least one embodiment, real-time data and real-time information may include "hazard data" and "hazard information." Hazard data may include, for example and not by way of limitation, any data indicative of any known, detectable, or otherwise arising hazards at an incident location. Non-limiting examples of hazards include furniture locations, presence of accelerants (oxygen, paint, chemicals, or the like), and other hazards. The presence, characteristics and/or location of such hazards may be presented to a responder as hazard information that the responder may utilize in responding to a given incident. For at least one embodiment, hazard information and/or other information may be presented visibly to a responder by use of color codes or the like that indicate a relevance, safety concern, or other consideration the responder should be aware of in responding to an incident.

With the advent of interconnected devices, such as IoT devices and other peripheral devices (hereafter individually and collectively, each an "IoT device"), global positioning system (GPS) and other location determination systems, cloud based storage technologies, digital record keeping systems and other technologies, it is to be appreciated that an insignificant amount of real-time data is presently available and is constantly growing. Such data and relevant information generated therefrom is typically not readily available to responders today.

Figure 1B:
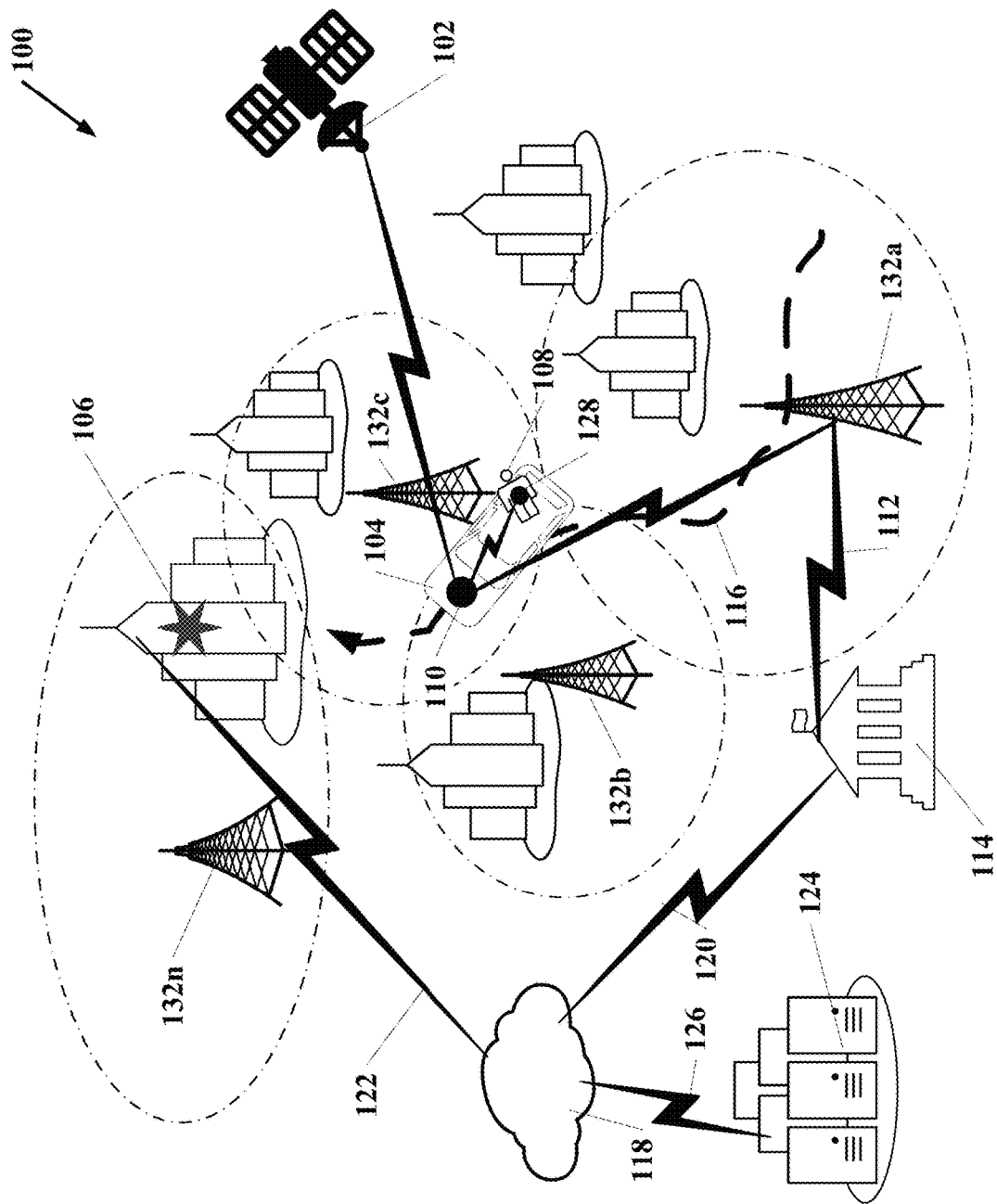
FIG. 1B is a schematic representation of the system of FIG. 1A as the responder has proceeded along a route to an incident location and in accordance with at least one embodiment of the present disclosure.

In FIGS. 1A and 1B and for at least one embodiment of the present disclosure, a system 100 for providing real-time data to responding systems and real-time information to responders is depicted. The system 100 may be configured to provide various layers of granularity of real-time data and real-time information. Such granularity may vary based on a proximity of a given responder to an incident, one or more given tasks assigned and/or to be assigned to a given responder regarding an incident, capabilities of a given responder (for example, as determinable in terms of equipment, personnel, training, or otherwise), and based upon other response factors.

As shown in FIGS. 1A and 1B, a macro level view of real-time data and real-time information may be provided at a macro level of granularity. Such macro level real-time data and real-time information may include for example, but is not limited to, location data, as provided by GPS system 102, for one or more of a responding vehicle 104 and an incident location 106.

A responding vehicle 104 may be configured to transport one or more responders 108a-n. Such responders 108 may be delineated individually and/or as a group (herein, a "squad"). Data and information about each responder and/or squad of responders is referred to herein as "squad data" and "squad information." Squad data and squad information may also be utilized in conjunction with one or more embodiments of the present disclosure in responding to an incident. For example, squad data indicative of a health condition, location and other information pertaining to a given responder may be captured, processed, communicated and presented to other members of a given squad (or a larger group of responders, such as a "company," "battalion," "department" or otherwise) and used in formulating a response to an incident on a real-time basis.

As further shown in FIGS. 1A and 1B, the responding vehicle 104 may include one or more communications and data processing systems, herein a "vehicle system" 110. The vehicle system 110 may be configured to provide communications and data processing capabilities on a mobile platform—the responding vehicle 104. As discussed further below, while an incident occurs, a responding vehicle 104 receives real-time data and provides one or more of real-time data and real-time information, respectively, to one or more responding systems and one or more responders. For at least one embodiment of the present disclosure, a responding vehicle to an incident may be configured to operate as an independent data reception and processing center, configured to provide relevant real-time data/information to one or more responding systems and responders. As used herein, "relevant" data and/or information is that data and/or information, respectively, which a given responding system and/or a given responder may find helpful in performing at least one task while responding to an incident. For example and not by limitation, relevant data/information to a fire person conducting a search may include one or more of image, sound, environmental, structural, population, hazard and squad data/information. By further non-limiting example, a fire person suppressing a fire external to a structure, after rescue searches have been completed, may find relevant data/information to include less information, such structural, hazard and squad data/information.

As further shown in FIGS. 1A and 1B, the responding vehicle 104 may be in communication, via a first communications link 112, with a base station 114. A base station 114 may be co-located with and/or separate from an emergency response system which received the alert. The base station 114 may be, for example, a fire department headquarters or a command unit (mobile or fixed) that has overall responsibility for coordinating one or more responding units to an incident. For at least one embodiment, the responding vehicle 104 may be routed along a route 116 to an incident location 106 such that communications connectivity between the responding vehicle 104 and the base station 114 (mobile or fixed) may be maintained.

As further shown in FIGS. 1A and 1B, the base station 114 may be communicatively coupled to a network 118, such as but not limited to, the Internet, via a second communications link 120. The incident location 106, from which an alert is generated, may also be communicatively coupled to the network 118 via a third communications link 122. One or more data centers 124 may also be communicatively coupled to the network 118 via fourth communications link 126. Each responder 108a-n may be each equipped with a responder system 128 that is communicatively coupled to the vehicle system 110 and/or to the base station 110 by a fifth communications link 130.

It is to be appreciated that the first communications link 112, second communications link 120, third communications link 122, fourth communications link 126, fifth communications link 130 and any other communications links utilized in one or more embodiments of the present disclosure may utilize any known and/or later arising communications, networking, data processing and related technologies and may include use of one or more shared components and/or technologies.

While the responding vehicle 104 is traversing the route 116 to the incident location 106, the vehicle system 110 may maintain the first communications link 112 with the base station 114 by use of one or more wireless transmission systems 132a-n. Such wireless transmission systems 132a-n may utilize any known or later arising technologies, including but not limited to, cellular systems, direct radio frequency communications links, satellite links, 3G/4G/5G systems, combination systems, or otherwise.

For at least one embodiment, upon a first alert message being generated, a responder may receive initial information regarding the incident. Such initial information may include, for example, a location of the incident, the type of incident (e.g., fire, auto accident, or otherwise) and any known characteristics of the incident. The initial information may be communicated to the responder at, first their station house or other point of departure, and/or, while traveling along a route 116 to the incident location 106, using various telecommunications technologies. As the responder proceeds along the route 116, when possible and for at least one embodiment, communications links remain active and useful between the vehicle system 110 in the responding vehicle 104 and a base station 114. It is to be appreciated, that often the initial information is incomplete and develops as the responder(s) proceed to the incident location 106. As shown in FIGS. 1A and 1B, a route 116 may be generated and selected such that communications between the base station 114 and the responding vehicle 104 are maintained throughout all or a substantial portion (when possible) of the route. However, it is to be appreciated, that for certain incidents, such as those where a quick response time is critical, a route may be generated that does not take into consideration the maintaining of communications between a base station and a vehicle system.

It is to be appreciated that such communications connectivity may not be maintainable in many situations, accordingly for at least one embodiment, a vehicle system 110 may be configured to store relevant information about multiple potential incident locations, with the responders selecting the relevant information for a given incident.

Figure 2:
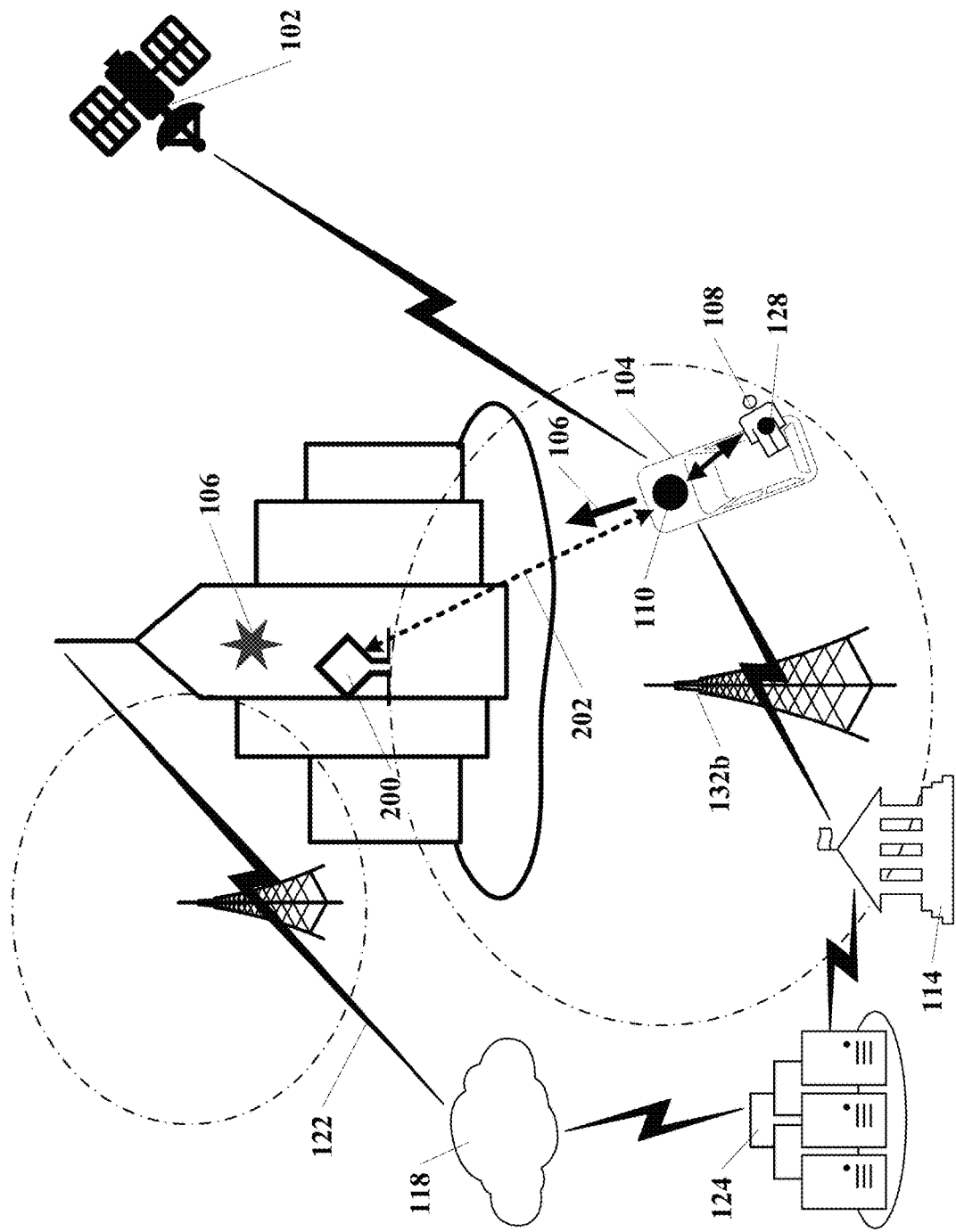
FIG. 2 is a schematic representation of the system of FIGS. 1A and 1B as the responder has proceeded along a route to an incident location and has reached a location within a range of a local transmitting system proximate to the incident location and in accordance with at least one embodiment of the present disclosure.

As shown in FIG. 2 and for at least one embodiment, as a responding vehicle 104 approaches an incident location, the responding vehicle 104 may come within communications range of a local transmitting system 200 proximate to the incident location. The local transmitting system 200 may communicate with the responding vehicle 104 via a sixth communications link 202. Like any of the first through fifth communications links, the sixth communications link 202, when available, may utilize any desired communications technologies to communicate relevant information to the responding vehicle 104 and the vehicle system 110 therein. It is to be appreciated that, by providing a local communication link between the responding vehicle 104 and the local transmitting system 200 proximate to the incident location 106, information regarding the incident may be provided without requiring use of long-distance communications systems whose operational capabilities may be jeopardized, in whole or in part, due to the incident or otherwise. The relevant information provided by the local transmitting system 200 may also be communicated by the vehicle system 110 to the base station 114 and/or to the responder system 128. For purposes of simplicity, in the various figures used herein only a single responding vehicle 104, a single vehicles system 110, a single responder 108, and a single responder system 128 is depicted. It is to be appreciated, however, that the devices, systems and processes described herein are not so limited and may be scaled to include any number of vehicles, responders, communications networks, base stations, incident locations and otherwise.

Figure 3:
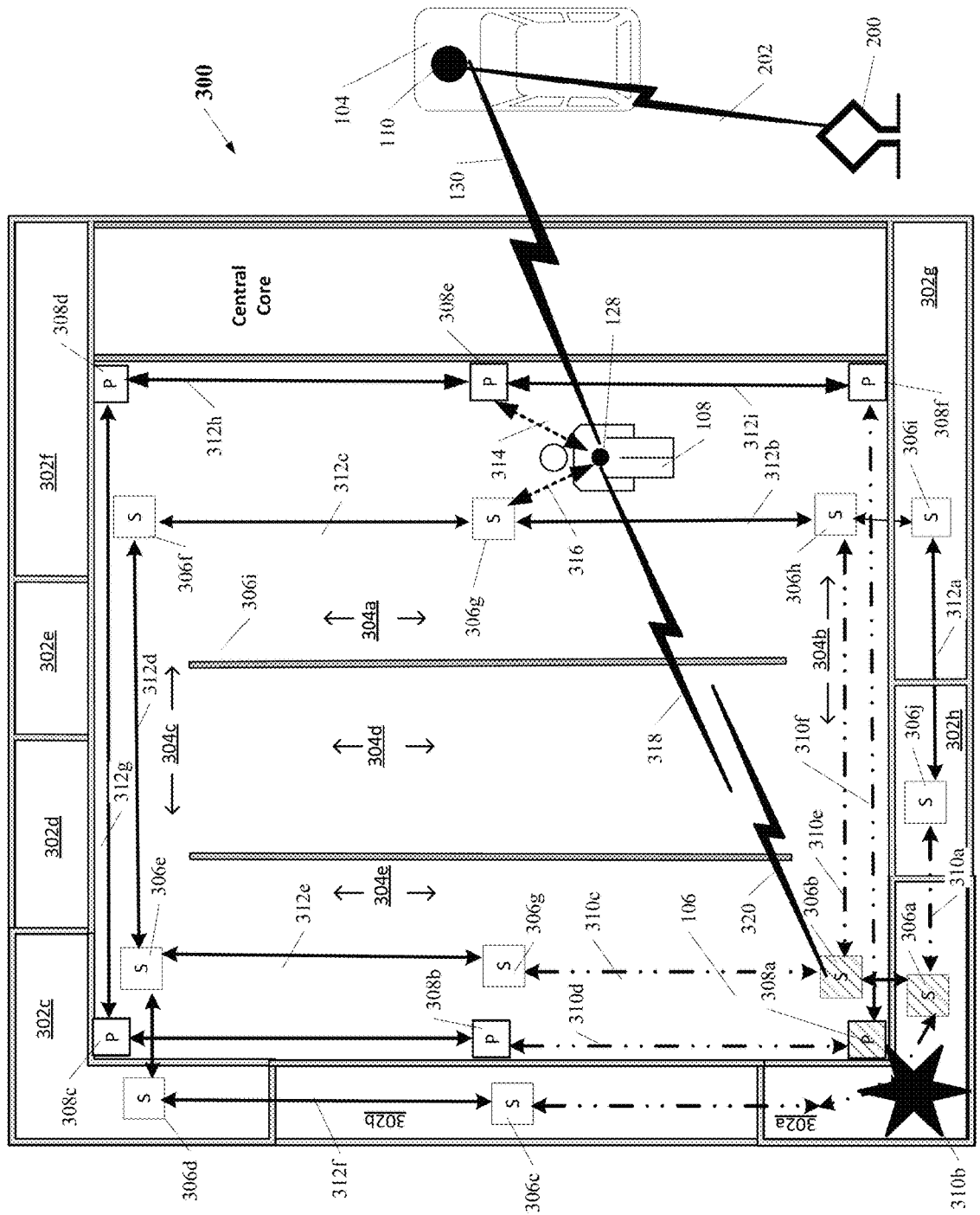
FIG. 3 is a schematic representation of a responder present on a floor of a multi-story structure at which an incident is occurring and communications links provided by one or more IoT devices and in accordance with at least one embodiment of the present disclosure.

As shown in FIG. 3, upon arriving at the incident location 106 which, for purposes of this explanation only, is depicted as a structural fire occurring on a floor of a multi-story building, the responder(s) 108 exit their vehicle and proceed to respond to the incident as desired by one or more commanding persons, protocols, or otherwise. For at least one embodiment, each responder system 128 may be updated with currently available and relevant information regarding the incident and with information that relates to the given responder's assigned responsibilities. The responder proceeds through the structure until arriving on the incident floor. As shown in FIG. 3, the incident floor 300 may include numerous offices 302a-n, workstations or cubicles (not shown), and hallways 304a-n. For purposes of simplicity, doors, windows and other common structural elements are not shown. The incident floor 300 also may include one or more IoT devices, such as IoT sensors 306a-j and IoT panels 308a-f.

As shown for at least one embodiment and during normal operations, one or more, including for at least one embodiment each, of the IoT sensors 306a-j and IoT panels 308a-f may be communicatively linked. As shown, multiple first communications linkages 310a-f and multiple second communications linkages 312a-i may be used between the IoT sensors 306a-j and IoT panels 308a-f. As shown in FIG. 3, the first communications linkages 310a-f indicate communication linkages that are inoperable due to the incident or otherwise, while the second communications linkages 312a-i indicate operable linkages. As shown, respective daisy chain and/or other linkages of IoT devices may be utilized for at least one embodiment of the present disclosure. For other embodiments, other linkage methodologies may be used as well as linkages between one or more IoT sensors with one or more IoT panels. The IoT sensors and IoT panels may be linked via wired, wireless, and hybrid wire and wireless connections. Any known or later arising technology capable of linking one or more IoT sensors and/or IoT panels with a second or more IoT sensors and/or IoT panels may be used in accordance with one or more embodiments of the present disclosure.

As shown in FIG. 3, a responder system 128 may also be communicatively linked to the one or more IoT sensors 306 and/or IoT panels 308. One or more third linkages 314 and one or more fourth linkages 316 may be used. It is to be appreciated that the third linkages 314 may arise between a responder system 128 and an IoT panel 308, such as IoT panel 308e. Such third linkage 314 may include use of a wired connection and/or a wireless connection. An IoT panel 308 may be any desired type of access or control panel. In one embodiment, an IoT panel 308 may include a pull handle by which a person can initiate sending of an alert. The fourth linkages 316 may arise between a responder system 128 and an IoT sensor, such as IoT sensor 306g. An IoT sensor 306 may be any type of sensor such as, but not limited to, smoke, fire, heat, intrusion, or otherwise. For at least one embodiment, IoT sensors and/or IoT panels may include any desired capability such as, but not limited to, providing video sensing, audio sensing, user interface controls, environmental sensing, and otherwise. Accordingly, it is to be appreciated that when a responder system 128 is linked with an IoT device, such as via a third linkage 314 and/or a fourth linkage 316, the responder system 128 may provide to the responder 108 relevant information of a highly localized nature that is accessible. Such relevant information may not be available to a vehicle system 110 via a local transmitting system 200 or otherwise.

As the responder 108 moves through the structure, new third linkages 314 and/or new fourth linkages 316 may be established between the responder system 128 and new IoT panels and/or new IoT sensors. For example, as the responder 108 moves along hallway 304a, the responder system 128 will come into closer proximity with IoT sensor 306h and IoT panel 308f. Such sensor and panel may be configured to provide more local information that may not be available via IoT sensor 306g and/or IoT panel 308e.

As shown in FIG. 3, the incident 106 is primarily occurring proximate to IoT sensors 306a and 306b and IoT panel 310b. As shown, first linkages 310a, 301b, 310c, 310d, 310e and 310f have each been interrupted by the incident 106. Accordingly, information available via IoT sensors 306a and 306b and via IoT panel 310b may not be available until the responder is within wireless range of such sensors and panel, assuming they are still operable. Accordingly, for at least one embodiment, each IoT sensor and IoT panel may be configured to include its own power source, e.g., a battery, as well as the ability to wirelessly communicate relevant information over a short distance, such as up to one hundred (100) feet.

Further, when information is unavailable from IoT sensors 306a and 306b and IoT panel 310b, the responder system 128 may be configured to use other IoT sensors or panels. Also, the responder system 128 may be configured to recognize that IoT sensors 306a/b and IoT panel 310b are not responding with the mesh network or other communications network used and the responder system 128 may be configured to attempt to directly establish wireless communications links with the impacted IoT sensor(s) and/or IoT panel(s). Accordingly, a broadcast signal 316 is shown in FIG. 3 as being broadcasted by the responder system 128. The broadcast signal 316 may be sent, for at least one embodiment, to wake-up or otherwise activate IoT sensors 306a/b and/or IoT panel 310b. Such IoT devices may be configured to enter into a power save mode in view of the incident arising and to awaken therefrom upon receipt of the broadcast signal 316.

Upon receiving the broadcast signal 316, one or more of the IoT sensors and/or IoT panels not otherwise communicatively linked to another IoT sensor and/or IoT panel may respond with a reply signal 320. As shown for the illustrative embodiment depicted in FIG. 3, only IoT sensor 306b responds with a reply signal 320. Based upon the non-reply by IoT sensor 306a and IoT panel 308a, the responder system 128 may be updated to indicate that such sensors and/or panels are inoperative. It is to be appreciated that the responder system 128 may thus be updated by one or more IoT sensors and/or IoT panels of relevant information regarding a given incident. Such relevant information may be provided over highly localized communications linkages that can utilize low power signals and do not require the use of power and bandwidth intensive wider area communications technologies. Accordingly and for at least one embodiment, each of the IoT sensor and/or IoT panels utilize IoT communications technologies, such as a Wireless Mesh Network (WMN).

The responder system 128 is accordingly provided with relevant data and generates relevant information for a given responder based upon the responder's actual location relative to an incident location. Such relevant information may be communicated to the responder 108 using any desired human presentation technologies including, but not limited to, audible, visual, tactile, vibrational, or otherwise. For at least one embodiment, at least some of the relevant information is presented to the responder 108 using augmented reality technologies. Using augmented reality technologies, a responder 108 may be presented with one or more visible and/or audible indicators providing relevant information about the incident. For example, a pathway to the incident location may be presented visibly. Audible instructions may be presented which assist the responder in navigating to the incident location and rendering assistance, as desired, determined real time, instructed by commanders, or otherwise.

The responder system 128 may be configured to present relevant information from one or more primary designated IoT sensors 306 and/or IoT panels 308. For at least one embodiment, a given IoT sensor 306 and/or IoT panel 308 may be automatically, semi-automatically and/or manually designated as "primary." When designated automatically, such designation may occur based upon one or more factors including, but not limited to, signal strength available to the responder system, proximity of the IoT device to the incident location, proximity to the responder system, relevant information provided by the IoT device, or otherwise. Other IoT devices may also provide relevant data and may also be communicatively linked to a responder system 128. Relevant data received from such other IoT devices may be indicated to a responder as relevant information in any desired manner or format. For example, relevant information from secondary IoT device(s) may be presented as a video overlay, using color coding, presented as a selectable menu option, audibly, or otherwise. Relevant data from one or more primary IoT devices may be combined with relevant data from one or more secondary IoT devices may be processed by a responder system 128 into combined relevant information for presentation to a given responder. A responder may be presented with relevant information from each designated primary IoT device(s) (there may be more than one) as well as additional/secondary IoT device(s). The designation of IoT device(s) as primary and/or secondary may vary throughout the course of an incident response. Such designations and designation changes may occur automatically (for example, in response to a fellow responder being identified as being in distress), semi-automatically (for example, in response to one or more selectable conditions which drive a change between IoT device designations), or manually.

Further, it is to be appreciated that the relevant data which the responder system 218 receives from one or more IoT sensors 306 and/or IoT panels 308 may also be communicated, via the fifth communications link, to the vehicle system 110, and, as desired, from the vehicle system 110 to the base station 114, other responders, or otherwise. In essence, each responder system 128 may be configured to act as both a receiver, repeater and transmitter of relevant data and relevant information. As a receiver, the responder system 128 provides a highly localized point of communication with IoT devices and the ability to repeat/send such data and/or information to others. As a transmitter, the responder system 128 may also act as a local source of relevant data and relevant information. One or more sensors may also be provided by a responder system 128, such as heat sensor, visible imaging system, audible sensors, biometric sensors, and otherwise. In essence, each responder system 128 may facilitate the capture of biometric data for responders as well as victims, such information may be real-time communicated to others as needed. Relevant data captured by a responder system 128 may also be presented to a responder or others as relevant information.

Figure 4:
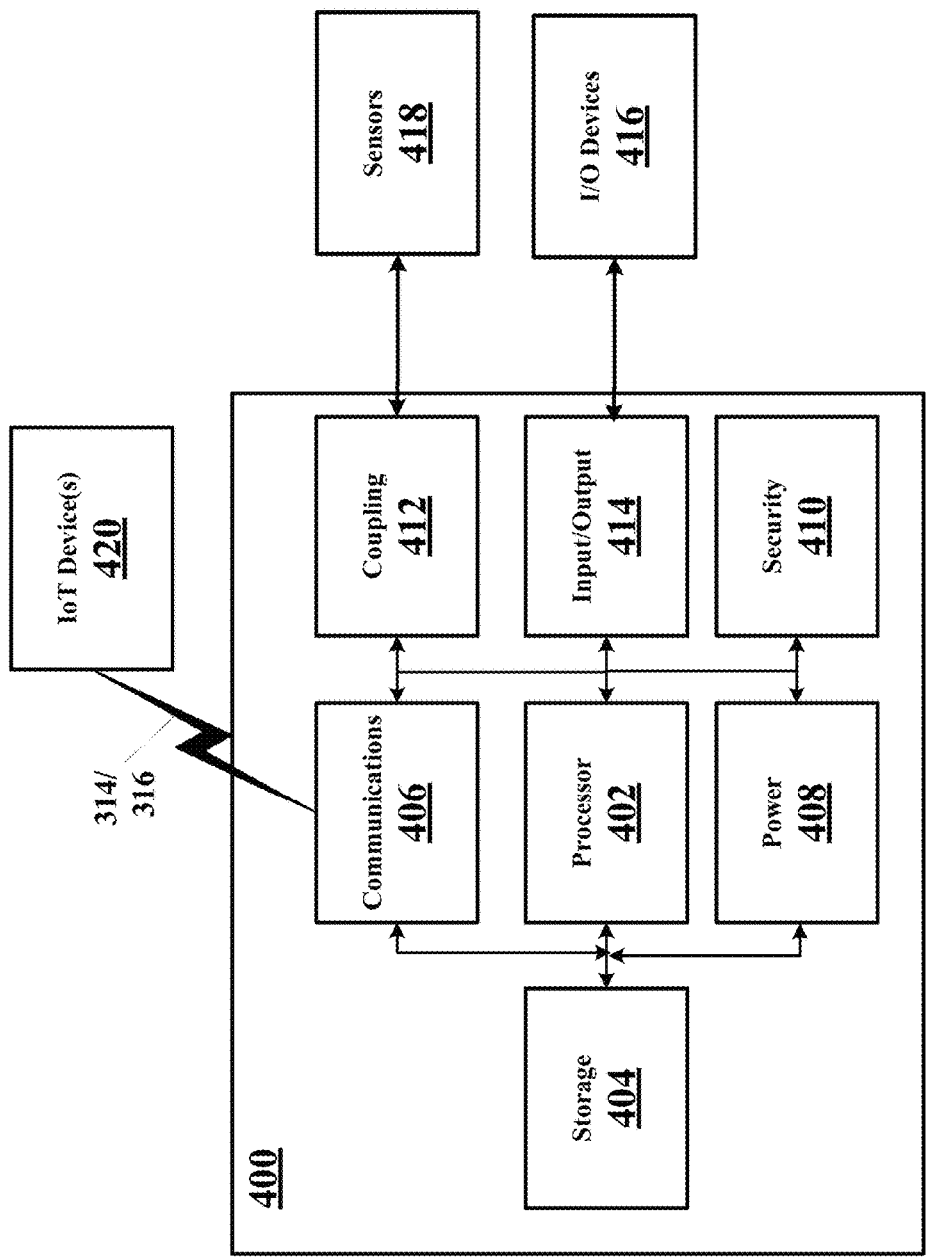
FIG. 4 is a schematic representation of components of a responder system and in accordance with at least one embodiment of the present disclosure.

As shown in FIG. 4 for at least one embodiment of the present disclosure, a responder system 128/400 may include one or more modules including, but not limited to, a processor module 402, a storage module 404, a communications module 406, a power module 408, a security module 410, a coupling module 412, and an input/output module 414.

For at least one embodiment, the processor module 402 may include computer hardware configured to execute non-transient computer instructions and perform computer operations on both transient and non-transient data. The hardware may include any general-purpose processor technology capable of supporting the features and functions described herein as well as any later arising features or functions to be supported. The processor module 402 may be configured to execute computer instructions written in any desired programming language including, but not limited to, PERL, C, C+, C++, or otherwise. Such computer instructions may be assembled, compiled, interpreted, or otherwise processed into one or more machine code instructions available for execution by the hardware provided by the processor module 402 or other elements of a responder system 128.

For at least one embodiment, a storage module 404 may include any desired use and/or combination of volatile and non-volatile storage technologies presently known and/or later arising. Non-limiting examples of such storage technologies include read only memory (ROM), random access memory (RAM), cache memory, magnetic storage devices, optical storage devices, flash memory devices, and others. The storage module 404 is communicatively coupled to at least the processor module 402 and may be communicatively coupled to the communications module 406 and connected for power purposes to the power module 408.

For at least one embodiment, a communications module 406 may include one or more transponders configured for communicating wirelessly with one or more IoT devices 420 and (not shown). Such communicatively coupling may occur using one or more third linkages 314 and/or one or more fourth linkages 316, as discussed above. The communications module 406 may also be communicatively coupled to a vehicle system 110. Other communications links may also be supported by one or more embodiments including, but not limited to, direct communications links between a responder system 128 and a GPS system 102, a base station 110, a wireless transmission system 132*a-n*, or otherwise. The communications module 406 is communicatively coupled to at least the processor module 402 and may be communicatively coupled to one or more other modules, as shown.

For at least one embodiment, a power module 408 may include one or more batteries or other electrical energy storage devices. Solar panels and the like may be connectable to recharge such batteries which may arise for example when a responder 108 is deployed to a remote region, for example in responding to a forest fire incident. The power module 408 may provide power to one or more of the modules, the sensors 418 and/or the I/O devices 416.

For at least one embodiment, a security module 410 may include one or more hardware processor configured to execute one or more computer executable instructions. The security module 410 may be configured security features for secure data storage, secure communications, and otherwise. A non-limiting example of such a security features include the use of encryption, scrambling and other technologies. Such security module components, technologies and features are well known and any currently available and/or later arising security components, technologies, and features may be utilized.

For at least one embodiment, a coupling module 412 may include one or more connectivity elements for connecting with one or more sensors. Any such coupling/connecting technologies may be used, non-limiting examples of which include ANT+ (for biometric data), BLUETOOTH™, or otherwise. Further, any desired type of known or later arising sensor may be coupled to the responder system 400.

For at least one embodiment, an input/output module 414 may be communicatively coupled to one or more input/output (I/O) devices such as, but not limited to, augmented reality glasses, earbuds, speakers and/or other audible output devices, tactile signaling systems, such as those that vibrate or otherwise generate a human touch detectable signal, input devices, such as keypads, buttons, microphones, eye trackers, and otherwise. It is to be appreciated that a responder may interact with the responding system in any desired manner, such as by speaking commands, selecting icons using buttons, touch pads, eye tracking, or otherwise. The input/output module 414 may be configured for use with any known or later arising human input/output technologies.

Figure 5:
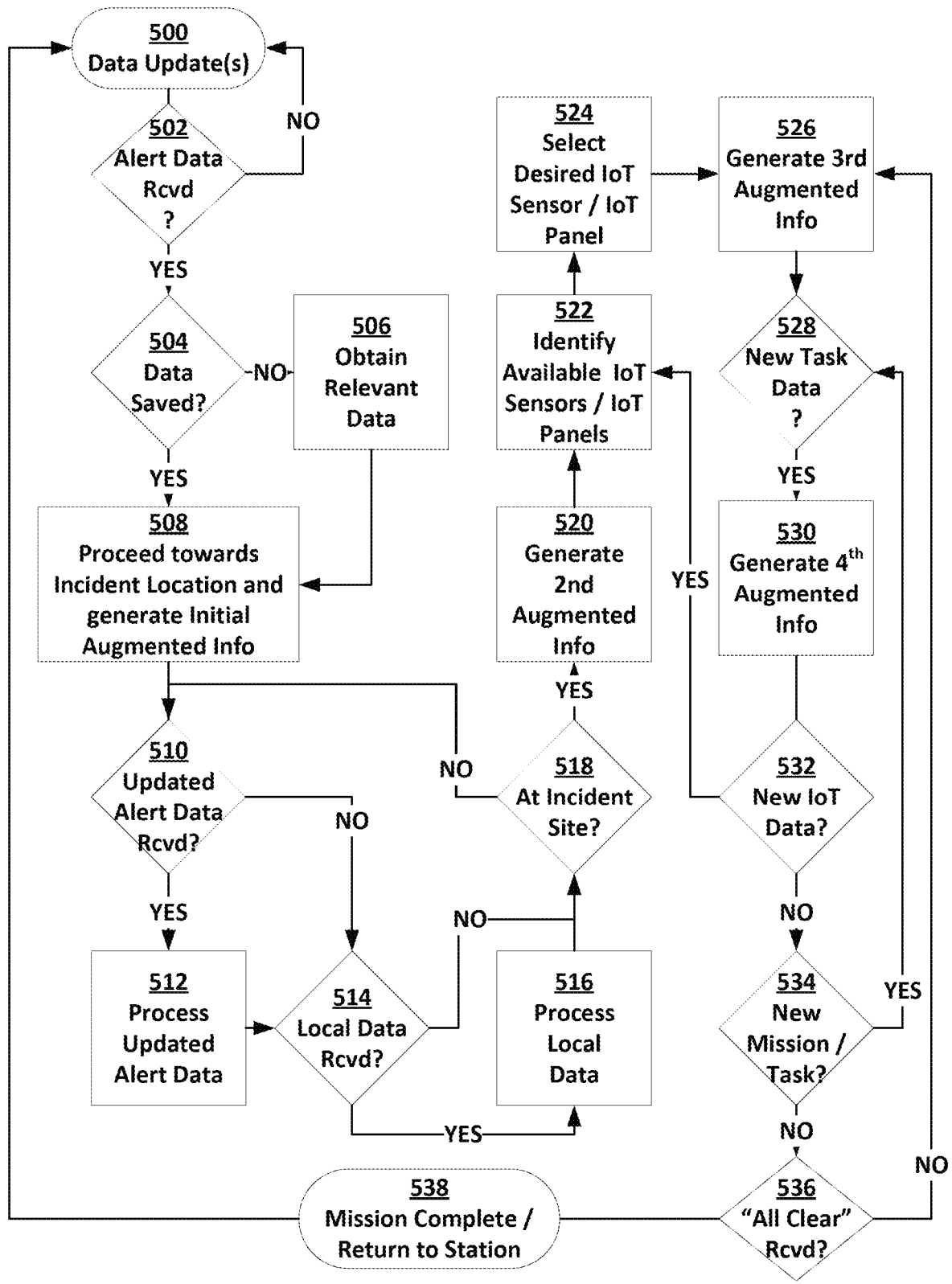
FIG. 5 is a flow chart illustrating one embodiment of computer executable instructions utilized to establish communications between a responder system and one or more IoT devices proximate to an incident location and in accordance with at least one embodiment of the present disclosure.

As shown in FIG. 5, a process for providing a responder with relevant real-time information for use in responding to an incident generally begins before an alert is received. One or more responder systems 128 may be periodically updated with data that may be relevant to an incident arising within their region of operations. For example, a fire department station house, and its responders operating therefrom, typically responds to incidents within a given distance of the station house. Accordingly, responder systems may be updated on an as desired basis with data that may be relevant to an incident arising within such operating region. For example, blueprints for office buildings may be pre-loaded into a responder's system. Likewise, data identifying locations of stairwells, standpipes, alarm panels, and other information may be preloaded into a responder system. Protocols, communications links supported and other data regarding IoT devices arising within such operating range may also be pre-loaded into a responder's system.

Per Operation 502, a check is periodically made to see if an alert is received. For at least one embodiment, each responder system is maintained in a power-on, ready-to-respond setting such that no human action is required for the responder system to react to a received alert. If no alert is received, periodic data updates continue, as per Operation 500.

Per Operation 504, when an alert is received, the responder system 128 determines whether relevant data for the incident, as based upon, for example, incident location information communicated in the alert, is already saved in the storage module 404 for that responder system 128.

Per Operation 506, if "NO", then the responder system 128 communicates with one or more external data sources to obtain available relevant data. As discussed above, sources of such relevant data may include one or more base stations 114, one or more data centers 124, or otherwise. Communications between the responder system 128 and such source of relevant data may be direct, via a vehicle system 110, or otherwise.

Per Operation 508, the responder 108 and responder system 128 associated therewith proceed towards the incident location and generates initial augmented information for presentation to at least one responder. As time is of often of the essence, it is to be appreciated that Operations 506 and 508, as well as other operations described herein, may occur in parallel. As discussed above, routing between a base station 114 and an incident location may be selected, as desired, such that communications links between a responder system 128 and one or more data sources providing relevant data for the incident may be maintained. While proceeding to the incident location, one or more responder systems 128 may be configured to begin presenting the relevant data, in the form of initial augmented reality information, to one or more responders. For example, an operator of a fire engine may be presented with relevant information identifying locations of fire hydrants, traveling directions, or otherwise. Such relevant information may be presented as the initial augmented reality information presented via the responder's responding system input and output module and/or via a vehicle system's input and output modules. Other responders may be presented with relevant information regarding an incident in an augmented and/or virtual reality presentation, such as a "fly-by" presentation identifying locations of alarm panels, IoT sensor and IoT panel locations, stairwell locations, and the like. Accordingly, it is to be appreciated that at least one embodiment facilitates the presentation of relevant information to responders using augmented reality, virtual reality and other information presentation technologies. Such augmented reality and/or virtual reality presentations of relevant information to responders enables the responders to receive a preview of options, hazards, and the like that may be present at the incident location.

Per Operation 510, a periodic check may be made to determine if updated alert data has been received. Such updated alert data may become available as additional IoT devices are activated, based upon human inputs to emergency response systems, and otherwise.

Per Operation 512, the new alert data is processed and provided to one or more responders as updated incident data. The updated data may be provided to one, all, or none of the responders, as determined in view of one or more mission parameters and/or assigned tasks for that responder. For example, police personnel responding to an incident may not need updated alert data corresponding to fire progression but would need updated alert data corresponding to establishing a secure perimeter about the incident location.

Per Operation 514, when the vehicle system 110 proceeds closer to the incident location, communications with a local transmitting system 200 may become available. The local transmitting system 200 may provide relevant local data not otherwise available, such as updated personnel data, sensors operative and inoperative, and otherwise. Such relevant local data may be relevant to only a subset of responders responding to the incident; accordingly, the process may include filtering of received data for relevance to the mission(s) assigned to a given responder. Per Operation 516, the relevant local data is processed and provided to those responders needing the same.

Per Operation 518, a check is periodically made to determine whether the responder has arrived at the incident site/location. When "NO," the responding system 128 continues to await and receive, as available, updated alert data, local data and process the same based upon the relevance of such data to a given responder's then assigned mission(s) and task(s).

Per Operation 520, upon arriving at the incident site, a responder system 128 generates second augment reality information of the incident location. Such second augmented reality view is based upon relevant data provided, to date, to the responder system 128. Such second augmented reality information may include, for example, directions to stairwells, locations of standpipes, locations of IoT sensors and/or IoT panels, and other relevant information. The second augmented reality information desirably enables the responder to efficiently progress through a building, for example, to a floor on which an incident (such as a fire) is located.

Per Operation 522, while the responder is proceeding through the structure to the incident location, the responding system 128 also begins searching for nearest transmitting IoT device. As discussed above, an incident location, such as a floor of a multi-story building, may include multiple IoT devices. Desirably, communications links between a responder system 128 and one or more operative and communicating IoT devices closest to the responder are established as soon as possible. It is to be appreciated that such IoT devices may be located on the same floor as the incident or otherwise and such IoT devices may provide the most relevant data then available regarding an incident.

Per Operation 524, communications links are established by the responding system 128 with one or more of the operable and transmitting and desired IoT devices. It is to be appreciated that the desirability of a given IoT device versus other available multiple operable and transmitting IoT devices may be determined automatically, semi-automatically, based upon responder selection, or otherwise. For example, a first IoT sensor providing only smoke presence data may be disregarded in view of a second IoT sensor providing smoke, heat, victims proximate, and other information. Such selection of IoT devices as primary or secondary devices may occur in view of a given responder's mission(s), assigned task(s), equipment available, responder training, and other data available to a responding system 128.

Per Operation 526, third augmented reality information is generated. Such third augmented reality information may provide an updated representation of the incident, as updated based upon available and/or selected IoT device(s). Such updates may occur on a real-time, pre-determined, periodic, continual, or other basis.

Per Operation 528, a periodic check is performed to determine whether a given responder's mission(s)/tasks(s) relative to the incident has changed. It is to be appreciated that an incident and a response thereto is often a dynamic environment, elements of which a given responder may have only a limited appreciation thereof. Accordingly, the responding system 128 desirably maintains communications links with mission commanders and other responders such that dynamic mission changes may be real-time communicated to a given responder.

For example, a general evacuation order may be received by responding system 128, which instructs a responder to cease their previously assigned mission and evacuate the structure. Such an evacuation order, or other mission/task change, desirably results in the responder system 128 generating fourth augmented reality information useful in performing the new mission(s)/task(s), as per Operation 530. It is to be appreciated that each of the initial, second, third and fourth augmented reality information may include information provided in a preceding version thereof with any new information being presented to a responder in a manner indicative of an importance of such new information. For example, an "evacuate" order may be presented audibly, visibly, and otherwise to a responder and, as desired, others proximate to such responder.

Per Operation 532, periodic checks are performed to determine if new IoT device data is available. If so, operations continue at Operation 522.

Per Operation 534, periodic checks are performed to determine if new mission(s) and/or task(s) are assigned to the responder. If so, operations continue at Operation 528.

Per Operation 536, periodic checks are performed to determine if a "clear" message has been received. If so, per Operation 538, the mission is considered complete and the responder returns to their assigned duty station and Operation 500 is resumed.

It is to be appreciated that the operations depicted in FIG. 5 are illustrative only and are not intended herein to occur, for all embodiments of the present disclosure, in the order shown, in serial, or otherwise. One or more operations may be performed in parallel and operations may be not performed, as provided for a given responder. For example, a responder may be recalled back to their station even while an incident is on-going for need of rest, recovery, availability for other incidents, or otherwise.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

The invention claimed is:

1. A process, providing relevant, real-time information to a responder, comprising:
    receiving, by a responder system, alert data identifying an incident location;
        wherein the responder system is associated with a responder and is configured to be communicatively coupled with at least one of a vehicle system and a base station;
    identifying a first Internet-of-Things ("IoT") device operable at the incident location;
    establishing a local communications link with between the responder system and the first IoT device;
    receiving, by the responder system and over the local communications link, first IoT device data directly from the first IoT device;
    generating, by the responder system, first augmented reality information;
    determining that the responder system has arrived at the incident location; and
    generating second augment reality information when the responder system has arrived at the incident location.

2. The process of claim 1,
    wherein the second augment reality information is generated based on incident location descriptive data.

3. The process of claim 2,
    wherein the incident location descriptive data includes at least one of locations of stairwells, doors, standpipes, locations of IoT sensors and locations of IoT panels.

4. The process of claim 2, further comprising:
    determining, while moving at the incident location, if updated alert data is available; and
        if the updated alert data is available,
            processing, by the responder system, the updated alert data to generate second updated alert data; and
            updating, by the responder system, the second augmented reality information based on the second updated alert data.

5. The process of claim 1, further comprising:
identifying a second IoT device operable at the incident location;
establishing a second local communications link with between the responder system and the second IoT device;
receiving, by the responder system and over the second local communications link, second IoT device data directly from the second IoT device; and
generating, by the responder system, third augmented reality information based on at least the second IoT device data.

6. The process of claim 5, further comprising:
identifying a third IoT device operable at the incident location; and
determining whether to establish a third local communications link with the third IoT device.

7. The process of claim 6, further comprising:
establishing the third local communications link when the third IoT device provides additional data; and
dropping the second local communications link when the second IoT device and the third IoT device provide duplicative data.

8. The process of claim 7,
wherein the first augmented reality information informs the responder of at least one of:
a mission presently assigned to the responder,
a task being performed by the responder,
a condition present within a localized area,
an item of equipment available to the responder, and
a training status of the responder.

9. The process of claim 8,
wherein the third augmented reality information further informs the responder of at least one additional condition present within the localized area.

10. The process of claim 1, further comprising,
receiving by the responding system a new task; and
generating additional augmented reality information relevant to the new task and based on the first IoT device data.

11. The process of claim 10, further comprising:
establishing a second local communications link with between the responder system and a second IoT device;
receiving, by the responder system and over the second local communications link, second IoT device data directly from the second IoT device; and
generating the additional augmented reality information based on the second IoT device data.

12. A system, providing relevant, real-time information to a responder, comprising:
a first responder device associated with a first responder;
a first Internet-of-Things ("IoT") device, communicatively coupled over a first local communications link with the first responder device;
wherein the first IoT device monitors an incident location for a first condition;
wherein the first IoT device periodically communicates first IoT device data to the first responder device; and
wherein the first IoT device data identifies whether the first condition exists at the incident location; and
a second IoT device, communicatively coupled over a second local communications link with the first responder device;
wherein the second IoT device monitors the incident location for at least one of the first condition and a second condition;
wherein the second IoT device periodically communicates second IoT device data to the first responder device; and
wherein the second IoT device data identifies whether at least one of the first condition and the second condition exists at the incident location;
wherein the first responder device comprises:
an input/output interface;
a data store non-transiently storing computer executable instructions; and
a processor, coupled to the input/output interface and the data store, which executes the computer executable instructions tor:
generate, based on one or more of the first IoT device data and the second IoT device data, augmented reality information that identifies, to the first responder, a condition detected by at least one of the first IoT device and the second IoT device; and
communicate the augmented reality information to the input/output interface.

13. The system of claim 12,
wherein the first local communications link is operable over distances up to one-hundred feet.

14. The system of claim 12,
wherein the augmented reality information includes a "fly-by" presentation of an incident location.

15. The system of claim 12,
wherein the first IoT device is at least one of an IoT sensor and an IoT panel.

16. The system of claim 12,
wherein the computer instructions further comprise:
decoupling the first responder device from one of the first IoT device and the second IoT device when the first IoT device data and the second IoT device data are duplicative.

17. The system of claim 16,
wherein the computer instructions further comprise:
receiving a new task; and
generating additional augmented reality information for the new task based on at least one of the first IoT device data and the second IoT device data.

18. The system of claim 17, further comprising:
a third IoT device, communicatively coupled over a third communications link with the first responder device;
wherein the third IoT device monitors a second incident location for at least one of the first condition, the second condition, and a third condition;
wherein the third IoT device periodically communicates third IoT device data to the first responder device; and
wherein the third IoT device data identifies whether at least one of the first condition, the second condition, and the third condition exists at the second incident location; and
wherein the computer instructions further comprise:
generating the additional augmented reality information for the new task further based on the third IoT device data.

19. The system of claim 18,
wherein the third communications link is a local communications link that directly couples the third IoT device with the responder device.

20. A computer readable medium, non-transiently storing computer instructions which, when executed by at least one processor provided in a responder device, generates augmented reality information relating, to an incident location, for presentation to a responder using the responder device, by performing operations comprising:
- receiving alert data identifying an incident location;
- establishing a first local communications link with between the responder device and a first IoT device operable at the incident location;
- receiving, by the responder device and over the first local communications link, first IoT device data directly from the first IoT device;
- generating the augmented reality information, by the responder device and based on the first IoT device data;
- determining that the responder device has arrived at the incident location; and
- identifying a second IoT device operable at the incident location;
- establishing a second local communications link with between the responder device and the second IoT device;
- receiving, by the responder device and over the second local communications link, second IoT device data directly from the second IoT device; and
- generating, by the responder device, updated augmented reality information based on at least the second IoT device data.

* * * * *

UNITED STATES PATENT AND TRADEMARK OFFICE
CERTIFICATE OF CORRECTION

PATENT NO. : 11,647,375 B2
APPLICATION NO. : 17/953614
DATED : May 9, 2023
INVENTOR(S) : Houston Beemer and Angela Beemer It is certified that error appears in the above-identified patent and that said Letters Patent is hereby corrected as shown below:

In the Claims

Column 19, Line 4, Claim 5, after the word "with" insert -- and --.

Column 20, Line 13, Claim 12, replace "tor" with -- to --.

Column 21, Line 4, Claim 20, after the word "with" insert -- and --.

Signed and Sealed this
Eighth Day of August, 2023

Katherine Kelly Vidal
*Director of the United States Patent and Trademark Office*